July 1, 1924.
J. L. MELTON
1,499,392
PNEUMATIC VEHICLE TIRE
Filed June 15, 1923
2 Sheets-Sheet 1
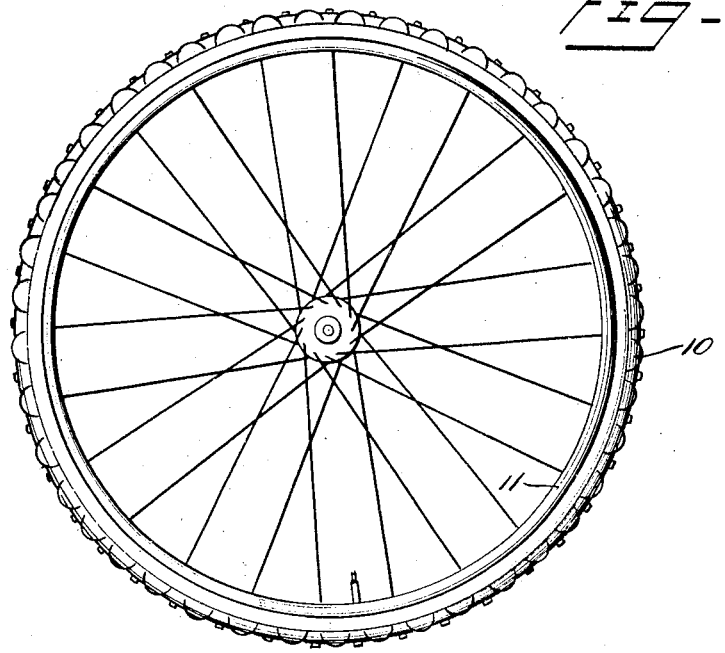
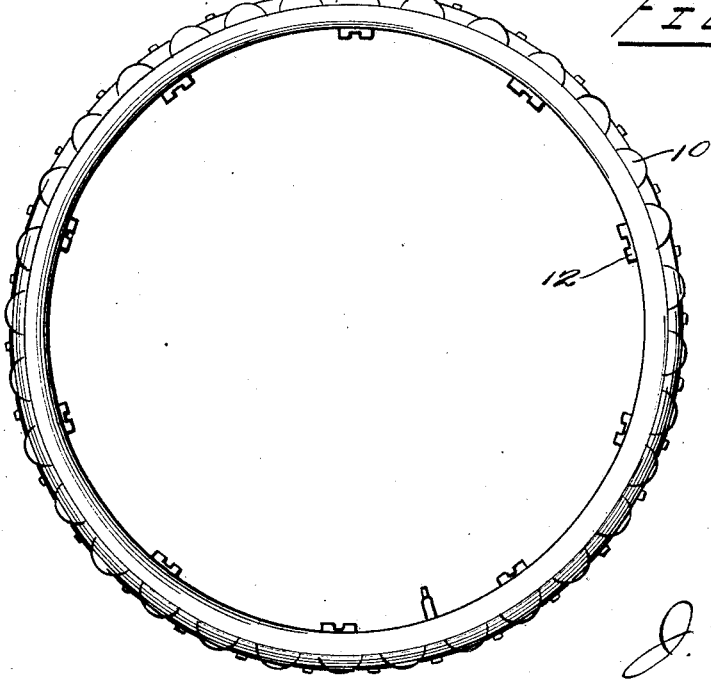
Inventor
J. L. Melton.

July 1, 1924.

J. L. MELTON

PNEUMATIC VEHICLE TIRE

Filed June 15, 1923

Inventor
J. L. Melton

Patented July 1, 1924.

1,499,392

UNITED STATES PATENT OFFICE.

JOHN L. MELTON, OF PORTSMOUTH, VIRGINIA.

PNEUMATIC VEHICLE TIRE.

Application filed June 15, 1923. Serial No. 645,604.

*To all whom it may concern:*

Be it known that I, JOHN L. MELTON, a citizen of the United States, residing at Portsmouth, in the county of Norfolk and State of Virginia, have invented certain new and useful Improvements in Pneumatic Vehicle Tires, of which the following is a specification.

My invention relates to improvements in pneumatic vehicle tires.

An important object of the invention is to provide a vehicle tire which will be firmly secured upon the rim.

A further object of the invention is to provide means which will prevent injury to the valve member, caused by movement of the tire upon the rim.

A further object of the invention is to provide a device of the above mentioned character which is simple and durable of construction and efficient for the purpose intended.

Other objects and advantages of this invention will be apparent during the course of the following description.

In the accompanying drawings forming a part of this specification and in which like numerals are employed to designate like parts throughout the same:

Figure 1 is a side elevation of the device secured to the rim of a wheel,

Figure 2 is a side elevation of the device itself,

Figure 3:
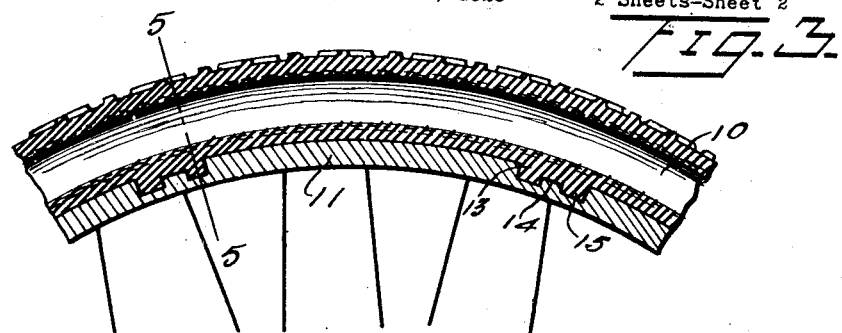
Figure 3 is an enlarged vertical longitudinal section through the tire and rim.
Figure 7:
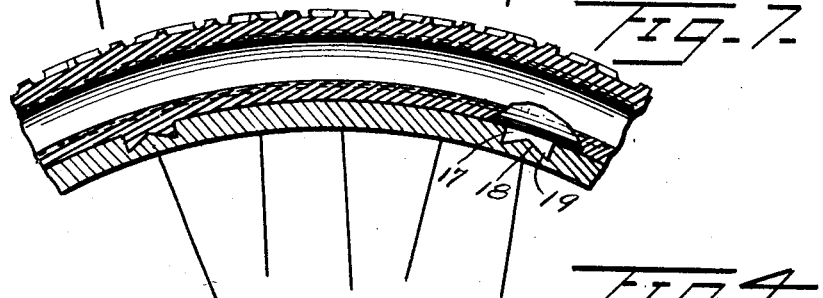
Figure 7 is an enlarged vertical longitudinal section through the tire and rim showing a modified form of the device.
Figure 4:
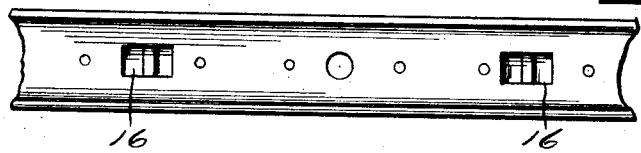
Figure 4 is an enlarged plan view of a portion of the rim.
Figure 6:
Figure 6 is a plan view of a portion of the tire.
Figure 5:
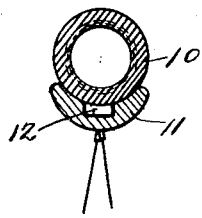
Figure 5 is a section taken on line 5—5 of Figure 3.

In the drawings, wherein for the purpose of illustration is shown the preferred embodiment of my invention, the numeral 10 designates a pneumatic tire which is mounted upon a rim 11. Spaced at any desired distances on the tire are a plurality of inwardly extending lugs 12. The lugs 12 as shown in Figures 2 and 3 are the preferred form and consist of a rectangular body portion 13, connected to the tire by means of vulcanization or the like. The body portion 13 is provided with a recess 14 cut transversely through the outer edge forming a projection 15 on both ends of the lug.

The rim 11 is provided with recesses 16 which are formed to receive the lugs 12 therein.

The numeral 17 indicates a modified form of lug which is cut in a V-shape manner as at 18, causing the end to be pointed as at 19.

Figure 8:
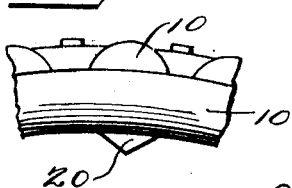
Figure 8 is a side elevation of a portion of the tire showing another modified form.

In Figure 8 another modified form is shown, the lug 20 in this case being triangular in shape.

Figure 9:
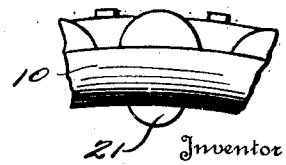
Figure 9 is a side elevation of a portion of the tire showing still another modified form.

Figure 9 discloses still another modified form of the lug 21 which is semi-circular in form.

The recesses in the wheel rim are to conform in shape to that of the lugs used. The lugs are to be preferably constructed of rubber, although it is perceivable that other materials may be used satisfactorily.

It is to be understood that the form of my invention herewith shown and described is to be taken as a preferred example of the same, and that various changes in the size, shape, and arrangement of parts may be resorted to without departing from the spirit of my invention, or the scope of the subjoined claims.

Having thus described my invention, I claim:—

1. The combination of a pneumatic tire, a plurality of lugs secured to the tire at spaced intervals, each of said lugs having a transverse recess cut therein forming a pair of projections extending from each lug, and a wheel rim having recesses formed therein to receive said lugs.

2. The combination of a pneumatic tire, a plurality of lugs secured to said tire each having a transverse V-shaped recess extending therein forming a pair of projections extending from each of said lugs, and a wheel rim having a recess formed therein to receive said lugs.

3. The combination of a pneumatic tire;

a plurality of lugs secured to the tire, a transverse recess cut from the center of each lug thereby forming a projection at each end thereof; and a wheel rim provided with recesses for receiving the lugs, and ridges formed in the recesses to engage the transverse recesses in the lugs.

In testimony whereof, I have affixed my signature in the presence of two witnesses.

JOHN L. MELTON.

Witnesses:
HENRY C. LEUETER,
F. A. CRUMP.